United States Patent [19]

Dahlqvist

[11] Patent Number: 4,727,566
[45] Date of Patent: Feb. 23, 1988

[54] METHOD TO TEST THE FUNCTION OF AN ADAPTIVE ECHO CANCELLER

[75] Inventor: Ingemar E. Dahlqvist, Johanneshov, Sweden

[73] Assignee: Telefonaktiebolaget LM Ericsson, Stockholm, Sweden

[21] Appl. No.: 787,803

[22] PCT Filed: Dec. 19, 1984

[86] PCT No.: PCT/SE84/00435
§ 371 Date: Oct. 15, 1985
§ 102(e) Date: Oct. 15, 1985

[87] PCT Pub. No.: WO85/03607
PCT Pub. Date: Aug. 15, 1985

[30] Foreign Application Priority Data

Feb. 1, 1984 [SE] Sweden ............................ 8400502

[51] Int. Cl.⁴ .............................................. H04B 3/46
[52] U.S. Cl. ............................................ 379/3; 379/410
[58] Field of Search ................. 379/3, 406, 407, 410, 379/411, 405, 408, 399; 370/32.1, 32

[56] References Cited

U.S. PATENT DOCUMENTS

| 4,005,277 | 1/1977 | Araseki et al. | 379/406 |
| 4,282,411 | 8/1981 | Stewart | 379/406 |
| 4,355,406 | 10/1982 | Guidoux | 370/32.1 X |
| 4,360,712 | 11/1982 | Horna | 379/410 X |
| 4,546,216 | 10/1985 | Tegethoff | 379/406 X |

Primary Examiner—Jin F. Ng
Assistant Examiner—R. Vaas
Attorney, Agent, or Firm—Roberts, Spiecens & Cohen

[57] ABSTRACT

A method for providing and for testing adaptive echo cancellation in an apparatus including transmission equipment for data communication. The apparatus includes a 2-wire to 4-wire hybrid circuit which receives a signal from a remote end which is cut off for purposes of the testing method. A signal consisting of randomly occurring ones and zeros is applied to the send end of the apparatus. Also included in the apparatus is an adaptive echo canceller which cooperates with the send end and with a filtered signal received from the hybrid circuit to produce a correction signal which is fed back to the adaptive echo canceller and which is also compared with threshold values for purposes of testing the function of the apparatus.

3 Claims, 2 Drawing Figures

METHOD TO TEST THE FUNCTION OF AN ADAPTIVE ECHO CANCELLER

FIELD OF INVENTION

The present invention relates to a method of testing an apparatus for adaptive echo cancellation and more particularly to a method for testing apparatus included in transmission equipment used for digital communication.

BACKGROUND

An apparatus for adaptive echo cancellation of the kind mentioned above has been previously described in Swedish patent application 8106444-6. As described in the Swedish application, echo cancellation of, for example, an incoming analogue signal is effected by correction signals from an adaptive balance filter, the correction signals being added to the incoming signal and the parameters of the balance filter being continuously or in stepwise fashion updated from a correction unit.

A known method of functionally controlling digital equipment is to loop circuit data flow from a transmitter to a receiver and to carry out a bit error measurement. In this way the transmitter, receiver and four-wire to two-wire junction of the echo cancellation apparatus can be functionally controlled.

SUMMARY OF INVENTION

Verification of the function of the echo canceller included in the apparatus involves certain problems, since a measuring signal must be supplied to the two-wire side of the apparatus in such a case. This means that an access relay must be connected to the two-wire circuit upstream of the hybrid circuit for supplying the measuring signal to the echo canceller. Also, the measuring signal must be line coded in the way employed in the send units of the apparatus with the object of simulating a remote signal. Finally, the echo is changed when the line is interrupted, which makes it theoretically possible for the echo from the measuring equipment to be inhibited, but not the echo from the line.

In the above mentioned apparatus of the prior art, it is of importance to establish that the correction unit and the digital balance filter fulfil their functions within given error margins. This means that the balance filter should supply correction values to a summator, which adds the correction values to incoming signals so that the value of the residue echo falls below a given limit. If the incoming signal is sampled and the correction signal consists of digital values at the addition, these values should be correct within given intervals. Incorrect values for the correction signals give poorer echo cancelling and can thus give rise to incorrect reception. As examples of causes may be mentioned: false supply values to the balance filter, deficient synchronism and fault in the memory cell structure of the balance filter, e.g. a faulty ROM in the storage unit.

The object with the present invention is to provide a method of testing the function of an adaptive echo canceller without using an access relay on the line side.

BREIF DESCRIPTION OF DRAWINGS

The invention will now be described in detail with reference to the accompanying drawing, wherein:

FIG. 1 is a block diagram of an apparatus for adaptive echo cancellation, in which the inventive method is utilized, and FIG. 2 is a diagram of some signals which occur in the apparatus according to FIG. 1.

DETAILED DESCRIPTION

Figure 1:
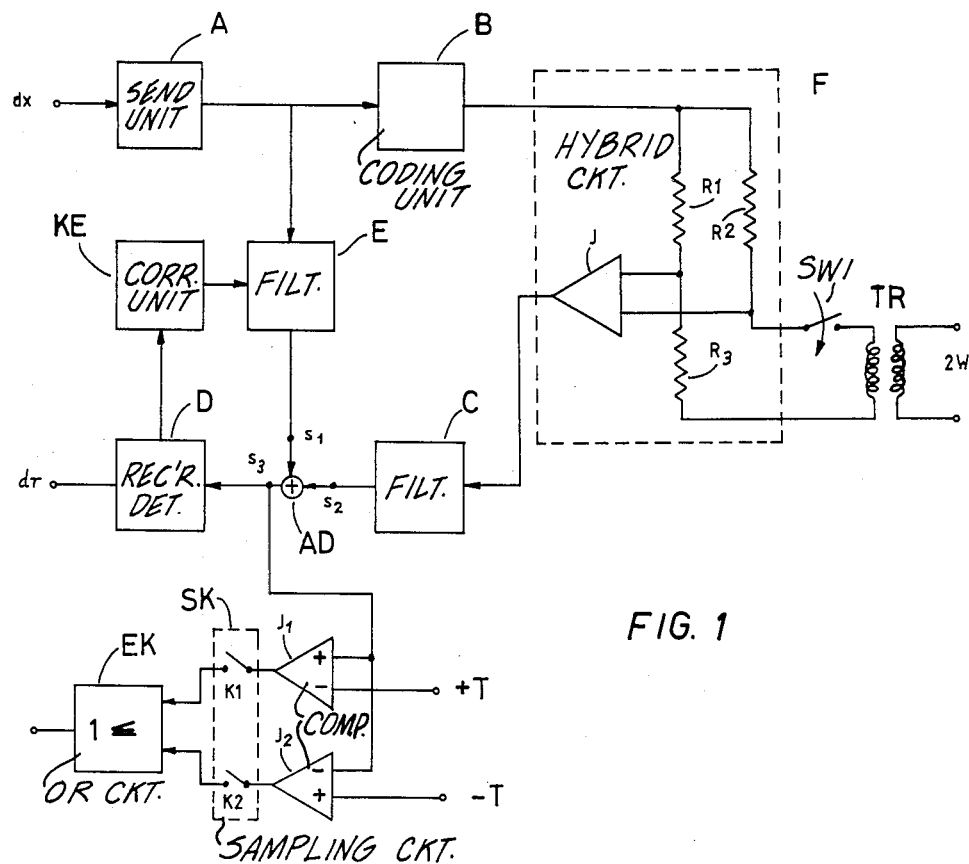

An apparatus for adaptive echo cancellation is illustrated in the block diagram of FIG. 1, together with a circuit for carrying out the method provided in accordance with the invention.

On the send side, the apparatus includes a send unit A for data with a coding unit B connected to the output of the send unit A for recoding send data to a suitable line code, e.g., a biphase code. The output of the coding unit B is connected to a two-wire to four-wire hybrid circuit F, here exemplified as a voltage bridge including the resistors R1, R2 and R3 as well as an operational amplifier J. In one of the two-wire paths a switch SW1 is connected to one terminal of a line transformer TR.

In the reception path of the apparatus, there is a filter circuit (a lowpass filter) C with its input connected to the ouput of the amplifier J for receiving and filtering the incoming line signal from the two-wire line. The output of the filter C is connected to a summator AD and further to a receiver detector D. The blocks KE, E, and AD constitute an adaptive echo canceller connected between the send and receive paths and to a summator AD. The filter E conventionally sends a correction signal $s_1$ to the received and filtered signal $s_2$, a signal $s_3$ being obtained, which is free from echo, as far as possible. A correction unit KE is conventionally connected between the detector D and the filter E for adjusting the filter parameters in the balance filter included in the echo canceller in dependence on the received and detected signal $s_3$. The plus input of a first and the negative input of a second comparator J1 and J2 may be connected to the output of the summator AD. The minus input of one comparator J1 is connected to a first threshold voltage $+T$ and the plus input of the other comparator J2 is connected to a second threshold voltage $-T$. Each output of the comparators J1 and J2 is connected to a contact K1 and K2, respectively, included in a sampling circuit SK. The contacts K1 and K2 are controlled such that sampling of the output signal from the associated comparator is done in the same way as for the received signal $s_3$ in the block D i.e., synchronous with the sampling rate in block D. An OR-circuit EK is connected to the output of the sampling circuit SK.

When testing the echo canceller function according to the inventive method, the echo canceller is connected in the normal way and the contact S1 is closed. The remote end transmitter is shut off so that no line signal occurs over the two-wire circuit 2W, apart from the one generated by the local sender (block A). A random bit flow, i.e. a bit flow in which "ones" and "zeros" occur randomly, is applied to the input dx of the sender A. This bit flow is transferred via the units B, F, and C to the input of the summator AD where it occurs as a signal $s_2$, and also to the echo canceller which gives a compensation signal $s_1$. For perfect echo cancellation $s_1 = -s_2$. The signal $s_3$ on the output of the summator AD gives the echo signal which has not been cancelled. This signal is taken to the inputs of both comparators J1 and J2 and is compared with the threshold values $+T$ and $-T$. If this signal $s_3$ is positive then the comparison with $+T$ is of interest, while the comparison with the threshold value $-T$ is of interest if $s_3$ is negative. After sampling in the circuit SK, there is obtained a "one" pulse or a "zero" (the absence of a pulse) on the output of the OR circuit EK according to the following conditions at the sampling instants:

If: $s_3 > +T$, a "one"($s_3 > 0$) is obtained $-T < s_3 < +T$, a "zero"($s_3 > <0$) is obtained, and $s_3 < -T$, a "one"($s_3 < 0$) is obtained.

The threshold values $+T$, $-T$ have a value selected such that the lowest expected remote signal can be detected even if the residue echo has such a value of amplitude.

The compared signals are sampled in the same way as a received remote signal, (e.g., 4 times/bit). An error signal v is obtained from the output of the OR circuit EK and consists of a pulse each time the echo canceller E cannot cancel the echo (the signal $s_2$ in its entirety) to a value less than $/T/$. The signal v, which is thus "zero" when the compensative signal $s_3$ is less than $/T/$ and "one" when $/s_3/ > /T/$ can be utilized and evaluated. A quality limit is suitably set for the echo canceller, measured by the quality detector QD in the number of error pulses ("ones") per second.

It is also conceivable to carry out the measurement of the compensated signal $s_3$ with the contact S1 open or with a nominal load connected to this contact. Noise disturbances thus disappear from the line, but the echo characteristic is simultaneously changed.

Figure 2:
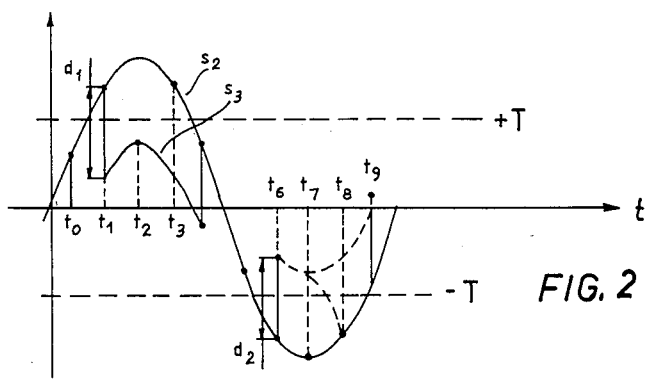

FIG. 2 illustrates both signals $s_2$ and $s_3$ in FIG. 1, and the action of a given compensation from the echo canceller E. The filtered signal $s_2$ is here assumed to be essentially sinusoidal and is sampled at the instants $t_0$, $t_1$, $t_2$, $t_3$, ... $t_6$, $t_7$, $t_8$, $t_9$, the echo canceller here sending at these instants a digital signal level $s_1$ for the compensation. For example, at $t_1$ there is sent a level $-d_1$ from the echo canceller to the summator AD, which lowers the level of $s_2$ so that the signal $s_3$ will come below the threshold $+T$. This is assumed to take place at the instant $t_3$ also. In a similar way, a compensation with $+d_2$ takes place at the sampling instants $t_6$, $t_7$ so that the level of the signal $s_3$ comes above the threshold $-T$. At the instant $t_8$ the compensation is assumed to lapse due to possible errors in, for example, one of the stored units in the echo canceller E, resulting in that the value of $s_3$ becomes lower than $-T$. Correct compensation takes place once again at the instant $t_9$. If the error returns a given number of times during a given time interval, e.g. during one second, this can be detected and measures taken. For example, the error may be due to a cell being faulty in the storage unit. If the storage unit is then addressed by a 7-bit word the error will occur on an average of every 128th sample.

With the inventive method, the remote signal is thus disconnected and it is a condition that the signal received from the local send side should be lower than a given absolute level $/T/$ for the echo cancellation to be acceptable.

I claim:

1. A method of testing the functioning of an apparatus for adaptive echo cancellation included in transmission equipment comprising a receiver side and a send side to transmit a send signal via a four-wire to two-wire hybrid circuit to a remote end, said apparatus developing an echo cancelling signal ($S_1$) for received signals ($s_2$) received from said hybrid circuit, said method comprising the steps of preventing signals from the remote end from being provided to the apparatus, and (b) comparing a compensated signal ($s_3$), obtained from said received signals ($s_2$) corrected by said cancelling signal ($s_1$), with at least one threshold ($+T, -T$), a quality limit of said echo cancellation being defined by the number of times the magnitude of said compensated signal ($s_3$) is greater than the absolute value of said threshold during a predetermined time interval.

2. A method according to claim 1 wherein said compensated signal ($s_3$) is compared with two threshold values ($+T, -T$) of opposite polarity.

3. A method as claimed in claim 1 wherein said quality limit is established such that the signal obtained after comparison with said threshold value is sampled and the number of signal samples thus obtained which exceed or fall below said threshold value ($+T, -T$) during the predetermined time interval are determined.

* * * * *